US008952808B2

(12) United States Patent
Steinman et al.

(10) Patent No.: US 8,952,808 B2
(45) Date of Patent: Feb. 10, 2015

(54) ARROW MOUNTED TRACKING APPARATUS (71) Applicant: Iron Mountain Products, LLC, LeCompton, KS (US)

(72) Inventors: Dennis Steinman, LeCompton, KS (US); Dennis Alan Falls, Olathe, KS (US)

(73) Assignee: Iron Mountain Products, LLC, LeCompton, KS (US)

(*) Notice: Subject to any disclaimer, the term of this patent is extended or adjusted under 35 U.S.C. 154(b) by 155 days.

(21) Appl. No.: 13/687,872

(22) Filed: Nov. 28, 2012

(65) Prior Publication Data
US 2013/0176123 A1 Jul. 11, 2013

Related U.S. Application Data (60) Provisional application No. 61/583,358, filed on Jan. 5, 2012.

(51) Int. Cl.
G08B 1/08 (2006.01)
A63B 65/02 (2006.01)
G08C 17/02 (2006.01)
G08C 19/00 (2006.01)
H04Q 9/00 (2006.01)

(52) U.S. Cl.
CPC ............. G08C 17/02 (2013.01); G08C 19/00 (2013.01); H04Q 9/00 (2013.01); H04Q 2209/40 (2013.01); H04Q 2209/823 (2013.01)
USPC .................. 340/539.13; 340/8.1; 340/572.8; 340/573.2; 473/578

(58) Field of Classification Search
CPC ...... G08C 19/00; G08C 17/02; A01K 11/002; G01S 13/75; F42B 12/385
USPC .................... 340/539.13; 473/578
See application file for complete search history.

(56) References Cited

U.S. PATENT DOCUMENTS

| 4,976,442 | A | 12/1990 | Treadway |
| 5,157,405 | A * | 10/1992 | Wycoff et al. ............... 342/386 |
| 5,188,373 | A | 2/1993 | Ferguson |
| 6,856,250 | B2 | 2/2005 | Hilliard |
| 7,300,367 | B1 | 11/2007 | Andol et al. |
| 7,331,887 | B1 | 2/2008 | Dunn |
| 7,632,199 | B2 | 12/2009 | Kikos |
| 8,192,309 | B1 | 6/2012 | Roberts |
| 8,323,132 | B2 | 12/2012 | Kirsch |
| 2003/0132846 | A1* | 7/2003 | Hilliard ..................... 340/573.2 |
| 2007/0105668 | A1* | 5/2007 | Kikos ........................... 473/578 |
| 2010/0035709 | A1 | 2/2010 | Russell |
| 2011/0250996 | A1* | 10/2011 | Jones ........................... 473/570 |
| 2012/0172158 | A1* | 7/2012 | Kirsch ........................ 473/570 |
| 2012/0220399 | A1* | 8/2012 | Ferguson .................... 473/570 |

* cited by examiner

Primary Examiner — Mohammad Ghayour
Assistant Examiner — Adnan Aziz
(74) Attorney, Agent, or Firm — Hovey Williams LLP (57) ABSTRACT An animal tracking device removably attachable to an arrow and including an antenna, a controller, a battery for powering the controller, a housing for housing the antenna, controller, and battery, and an animal attachment component fixed to the housing. The controller may transmit wireless signals to a receiver via the antenna. The housing may have a first and second portion pivotally attached at a first joint. The first and second portions may also meet, but not attach with each other, at a second joint in a closed position. The first and second portions may pivot between the closed position and an open position about the first joint, may be naturally biased in the open position, and may be detachably attached in the closed position to the arrow shaft. The animal attachment component may attach to an animal shot by the arrow, forcing the housing away from the arrow.

19 Claims, 10 Drawing Sheets

ARROW MOUNTED TRACKING APPARATUS

RELATED APPLICATIONS

This application claims priority benefit of a provisional application entitled, "ARROW MOUNTED TRACKING APPARATUS," Ser. No. 61/583,358, filed Jan. 5, 2012 and incorporated by reference herein in its entirety.

BACKGROUND

Archery generally includes the use of a bow to propel an arrow toward a target, such as an animal being hunted. When hunting, a common problem is that game shot with an arrow may run long distances and hide before dying. Arrow-mounted tracking devices have been developed to help track shot game, but the arrow and attached tracking device may sometimes pass through the animal instead of remaining lodged in the animal. Furthermore, the weight and configuration of such a tracking device may affect the trajectory of the arrow in an undesired manner, making the animal more difficult to hit with the arrow.

Therefore, there is a need for an improved method and apparatus for tracking game shot with arrows.

SUMMARY

Embodiments of the present invention solve the above-mentioned problems and provide a distinct advance in the art of tracking game shot with arrows. An embodiment of the invention is an animal tracking device for removably attaching to an arrow shaft. The animal tracking device may include an antenna, a controller communicably coupled with the antenna, a battery electrically coupled with the controller, a hollow housing, and an animal attachment component fixed to the housing. The controller may send wireless signals to a remote receiver via the antenna. The housing encloses the antenna, controller, and battery and may have first portion and a second portion pivotally attached with each other at a first joint and meeting, but not attached with each other, at a second joint in a closed position. The housing may pivot between the closed position and an open position about the first joint and may be detachably attached in the closed position to the arrow shaft. The housing may be naturally biased in the open position when not attached to the arrow shaft. The animal attachment component may attach to a target or animal shot by the arrow and thereby force the housing away from the arrow. In one embodiment of the invention, the animal attachment component may include a sharpened wire extending forward from the housing and may pierce a target or animal shot by the arrow, slowing or stopping forward momentum of the housing and thus forcing the housing away from the arrow as the arrow continues to pass through the animal and leave behind the animal tracking device attached to the animal.

Another embodiment of the invention may include a method of tracking an animal. The method may include the steps of closing a housing of a transmitter in a closed position around a shaft of an arrow and inserting at least a portion of the housing into a sleeve attached to the shaft of the arrow, thereby detachably attaching the housing to the sleeve. The housing may have a first portion and a second portion pivotally attached with each other at a first joint and meeting, but not attached with each other, at a second joint in the closed position. The first and second portions may pivot between the closed position and a naturally-biased open position about the first joint. An animal attachment component may extend from the housing for piercing a target or animal. The method may further include a step of shooting the arrow into the target or animal such that the animal attachment component pierces the target or animal, pulling the housing away from the sleeve such that the housing returns to its naturally-biased open position. Finally, the method may include a step of tracking wireless signals emitted from the transmitter with a receiver.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
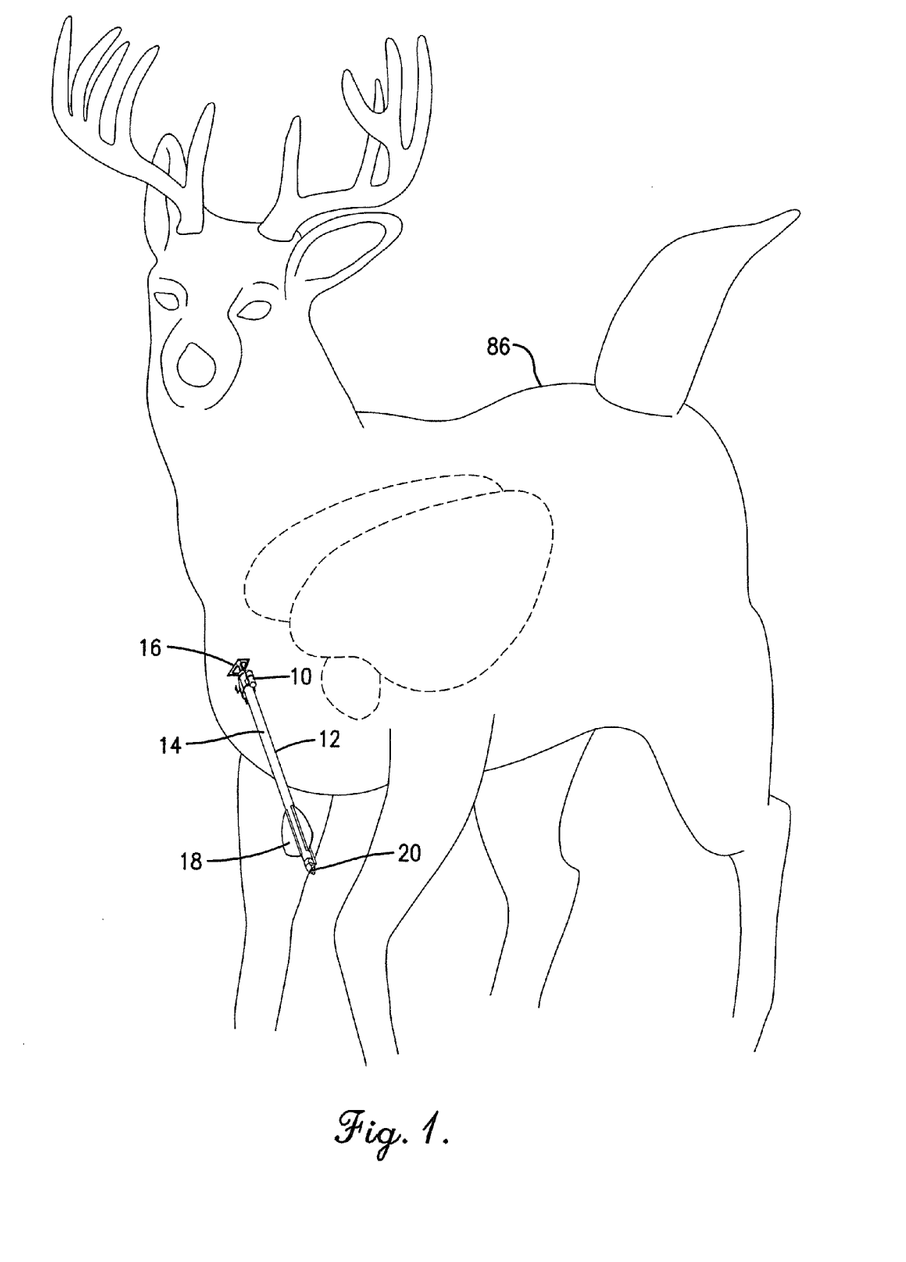
FIG. 1 is an environmental view of an arrow and arrow tracking device constructed in accordance with an embodiment of the present invention and shown lodged in a deer.
Figure 2:
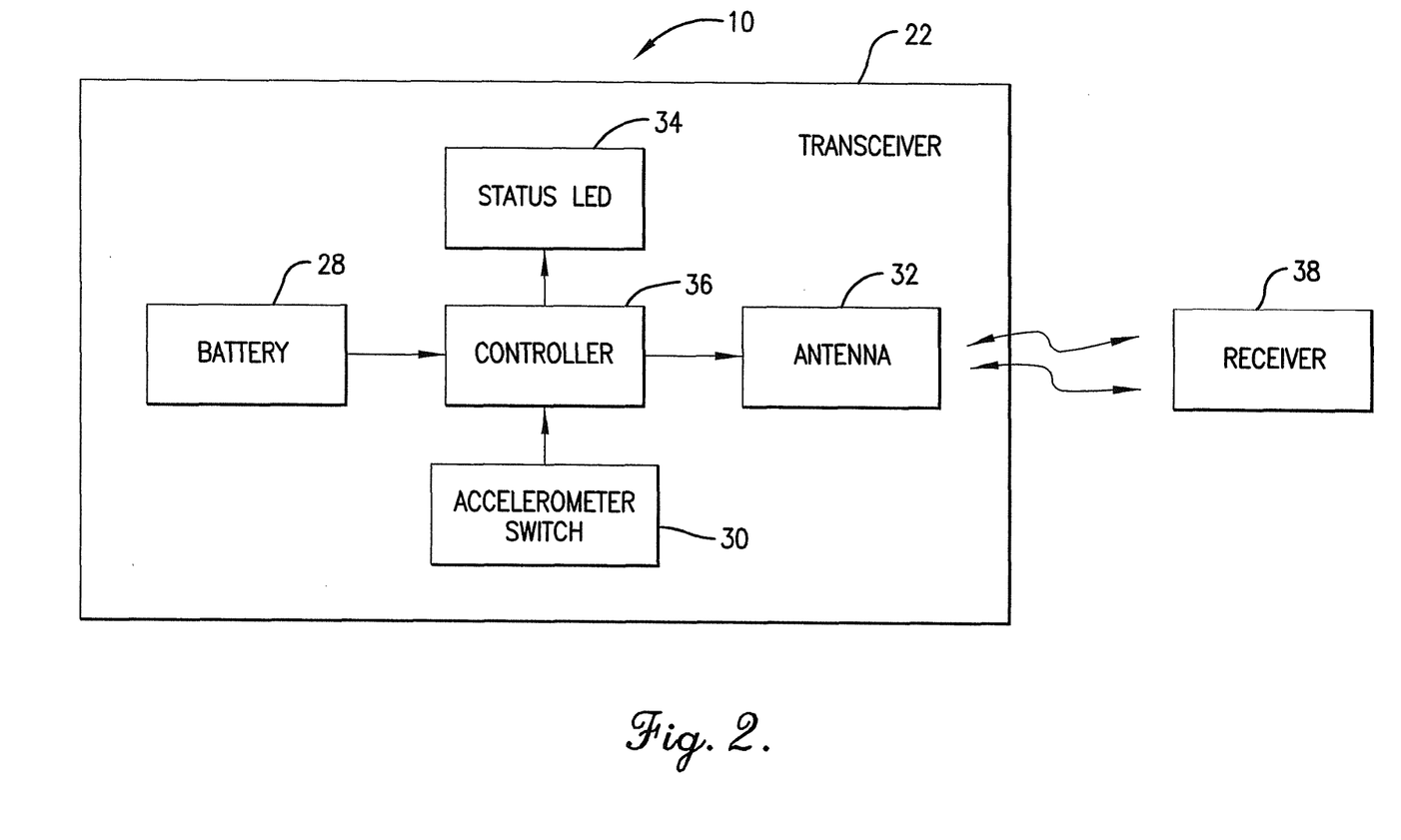
FIG. 2 is a block diagram of components of the arrow tracking device of FIG. 1.
Figures 3, 3A:
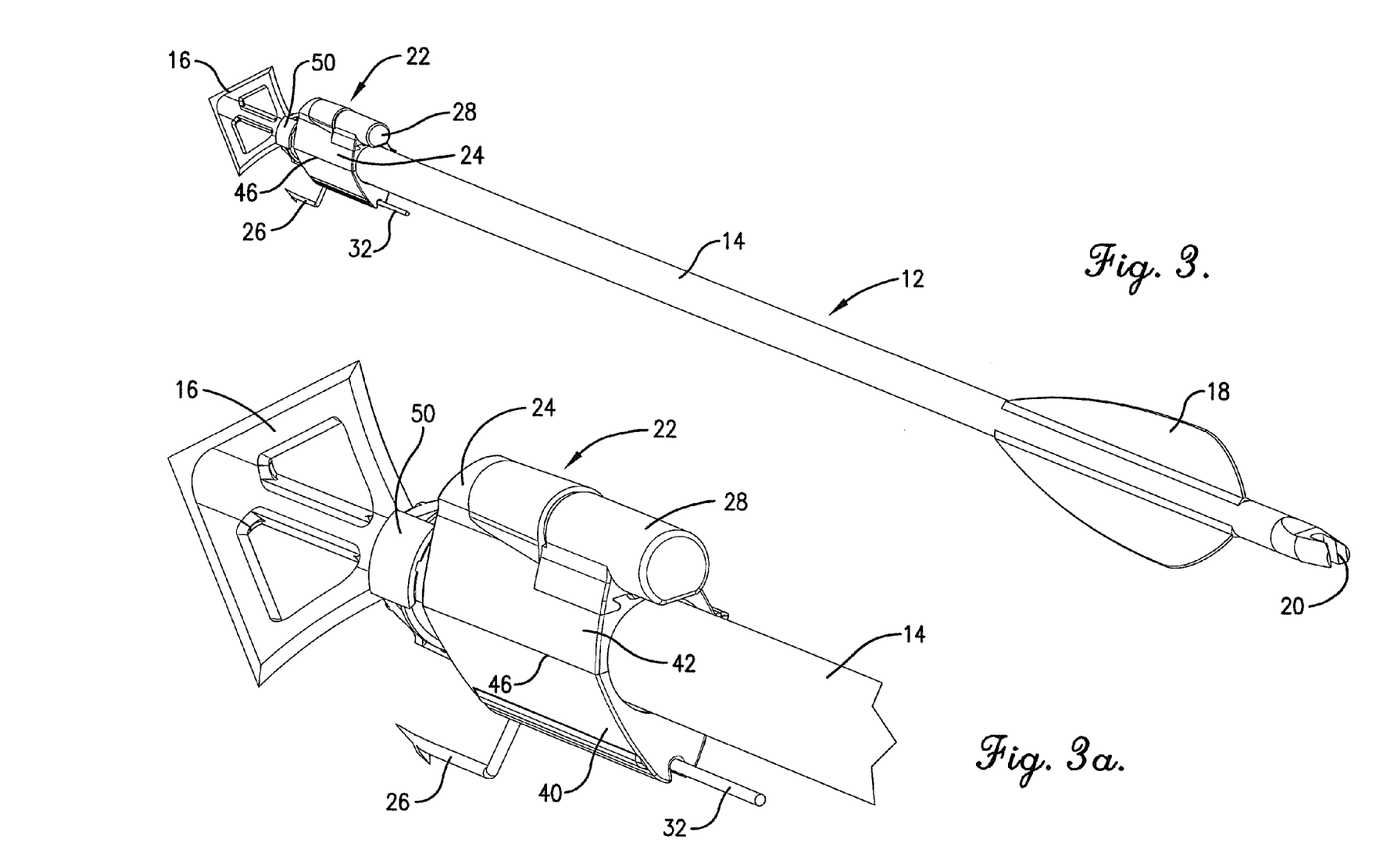
FIG. 3 is a perspective view of the arrow and the arrow tracking device of FIG. 1.
FIG. 3a is an enlarged fragmentary perspective view of the arrow and the arrow tracking device of FIG. 1.

An animal tracking device 10 constructed in accordance with embodiments of the present invention and configured to detachably attach to an arrow 12 is illustrated in FIGS. 1-12. The arrow 12 may be any conventional arrow and may comprise, for example, a shaft 14, an arrowhead 16, fletching 18, and a nock 20. Additionally or alternatively, the arrow 12 may be a bolt or quarrel shot from a cross bow. As illustrated in FIGS. 2 and 3, an embodiment of the animal tracking device 10 may comprise a transmitter 22 having a housing 24, an animal attachment component 26, a battery 28, an accelerometer switch 30, an antenna 32, a status light emitting diode (LED) 34, and a controller 36. The animal tracking device 10 may further comprise and/or communicate with a receiver 38 configured for receiving signals transmitted by the transmitter 22. Note that the transmitter 22 may be configured to transmit wireless signals to the receiver 38 or may alternatively be replaced with a transceiver configured to both send and receive wireless signals to and from the receiver 38 without departing from the scope of the invention.

Figures 4, 5:
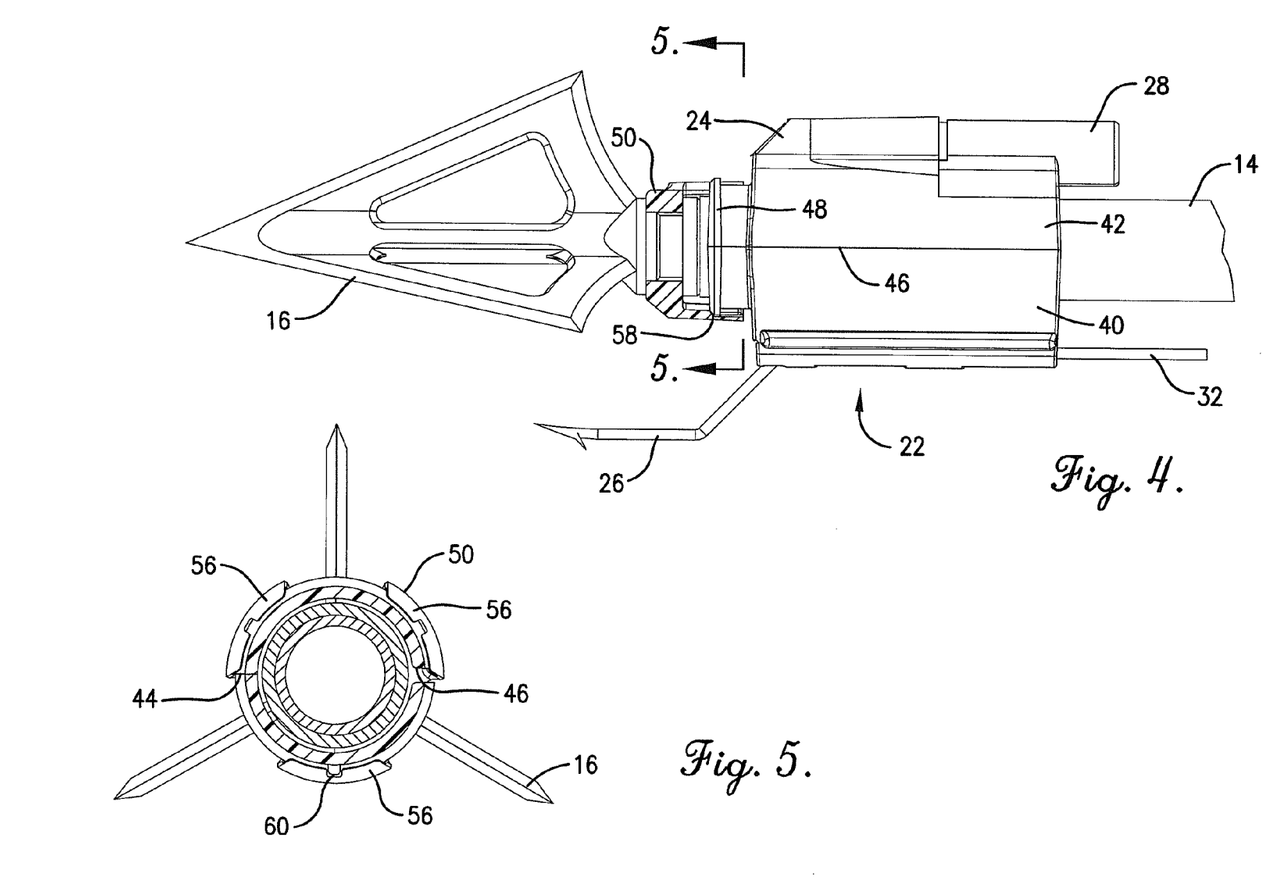
FIG. 4 is an enlarged fragmentary elevation view of the arrow and the arrow tracking device with a cross-sectional view of a sleeve for attaching the arrow tracking device to the arrow.
FIG. 5 is a cross-sectional view of the sleeve and arrow tracking device taken along line 5-5 of FIG. 4.

The housing 24 may be a hollow, clam-shell housing or any other housing having two portions 40,42 pivotally attached with each other at a first joint 44, as illustrated in FIGS. 6-10, and configured to touch but not attach to each other at a second joint 46, as illustrated in FIGS. 3-5. The first joint 44 may join the two portions 40,42 of the housing 24 together using any type of hinge, such as a living hinge, as illustrated in FIGS. 6-10. For example, the housing 24 may be made of plastic and the hinge may merely be a line of weakness between the two portions 40,42 allowing flexure thereof and pivoting of the two portions 40,42 of the housing 24 about the line of weakness. The housing 24 may be naturally biased in at least a partially open position when disconnected from the arrow 12, as illustrated in FIGS. 6-12 and held in a closed position when attached to the arrow 12, as illustrated in FIGS. 1, 3, 3a, 4, and 5.

Figure 6:
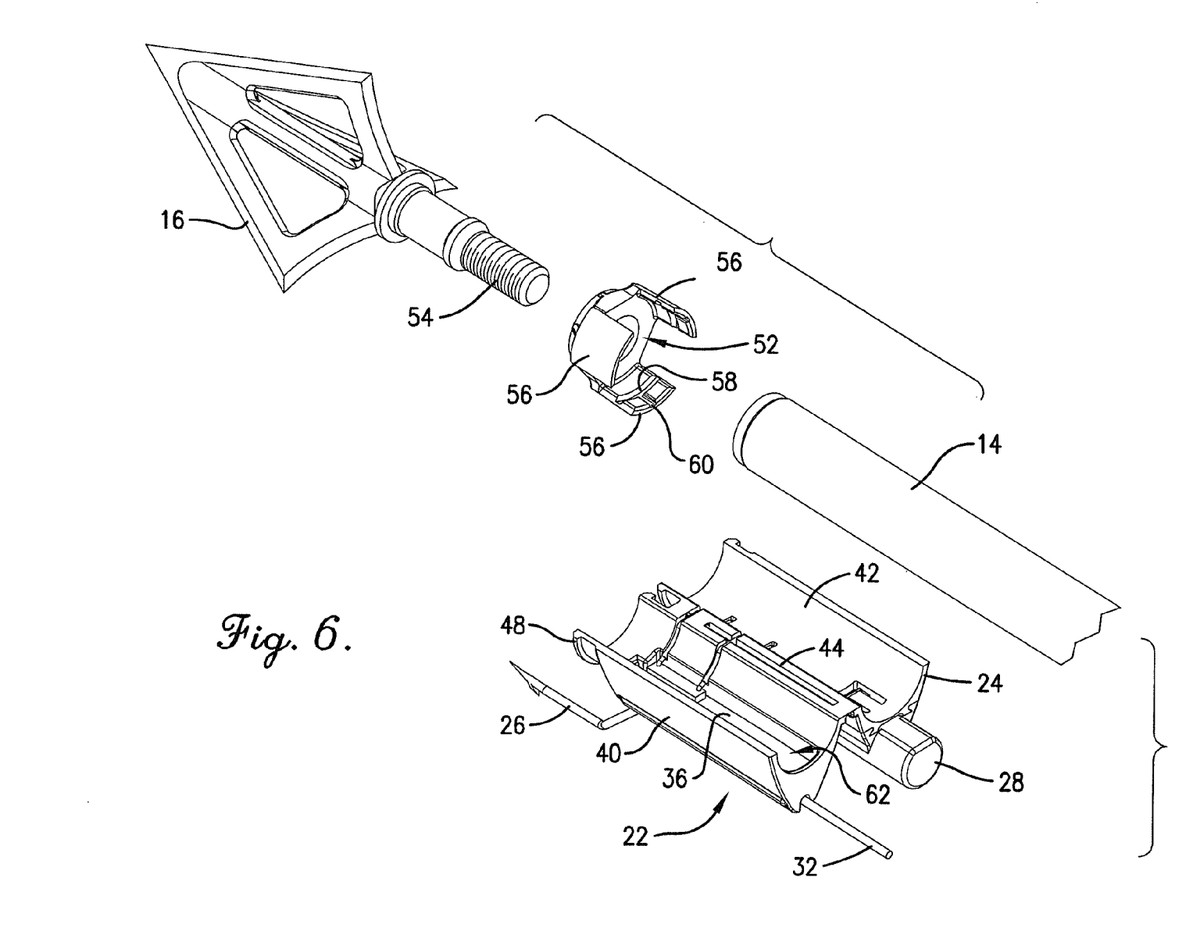
FIG. 6 is an exploded fragmentary perspective view of the arrow and arrow tracking device of FIG. 1.

The two portions 40,42 may cooperatively form a hollow space through which the shaft 14 of the arrow 12 may extend. Furthermore, the two portions 40,42 may each comprise a lip 48 or ledge cooperatively configured to detachably attach the housing 24 to the arrow shaft 14. For example, the animal tracking device 10 may further comprise and/or be configured to attach to a sleeve 50 or bushing attachable to and/or between the arrowhead 16 and/or the shaft 14. As illustrated in FIG. 6, the sleeve 50 may have a hole 52 formed therethrough and a portion of the arrowhead 16 may extend through the hole 52 and into a hollow end of the shaft 14 of the arrow 12. Specifically, the arrowhead 16 may be configured with a threaded portion 54 configured to screw into the shaft 14, mating with matching threads formed within the shaft 14 of the arrow 12. This configuration may allow the sleeve 50 to be inserted over the threaded portion 54 of the arrowhead 16 and secured between the arrowhead 16 and the shaft 14 of the arrow 12. In other alternative embodiments of the invention, the sleeve 50 may be integrally formed with the arrow 12.

The sleeve 50, as illustrated in FIGS. 4-6, may be a flexible or elastic retainer such as a flexible retaining band that holds the clam shell housing 24 closed on the arrow shaft 14. For example, the sleeve 50 may have a plurality of tabs 56 extending away from the hole 52 in an aft direction away from the arrowhead 16 and radially spaced a small distance apart from the arrow's shaft 14. As illustrated in FIG. 6, the tabs 56 may each have ledges, indentions, or channels 58 formed therein, configured to mate with the lip 48 or ledge extending outward from the two portions 40,42 of the housing 24. The sleeve 50 may be formed of plastic, metal, or any material configured to slightly flex outward, away from the shaft 14, as the lip 48 or ledge of the housing 24 slides between the tabs 56 and the arrow shaft 14 to mate with the ledges, indentions, or channels 58 of the tabs 56. The sleeve 50 and/or the housing 24 may also comprise clocking features 60, such as a protrusion and a mating indention or retention feature, preventing the housing 24 from rotating within the sleeve 50. For example, a protrusion extending from the housing 24 at or proximate to the lip 48 thereof may be configured to slide within a secondary channel formed in an inner surface of the sleeve 50 and positioned substantially perpendicular from the channels 58, as illustrated in FIGS. 5 and 6.

The two portions 40,42 of the housing 24 may include a first portion 40 and a second portion 42, and may further comprise cavities 62,64 or chambers formed therein and/or attachment locations thereon for attaching the controller 36, battery 28, accelerometer switch 30, antenna 32, animal attachment component 26, and/or status LED 34 to the housing 24. For example, in one embodiment of the invention, the first portion 40 of the housing 24 may have a first cavity 62 for housing the controller 36 while the second portion of the housing 24 may have a second cavity 64 configured for housing the battery 28 therein. The cavity or cavities 62,64 formed into the housing 24 may have any size and configuration. However, substantially evenly distributing the weight of the controller 36 and battery 28 on the two separate portions 40,42 or on two separate sides of the housing 24 may advantageously have a minimal effect on the arrow's trajectory.

Figures 7, 8:
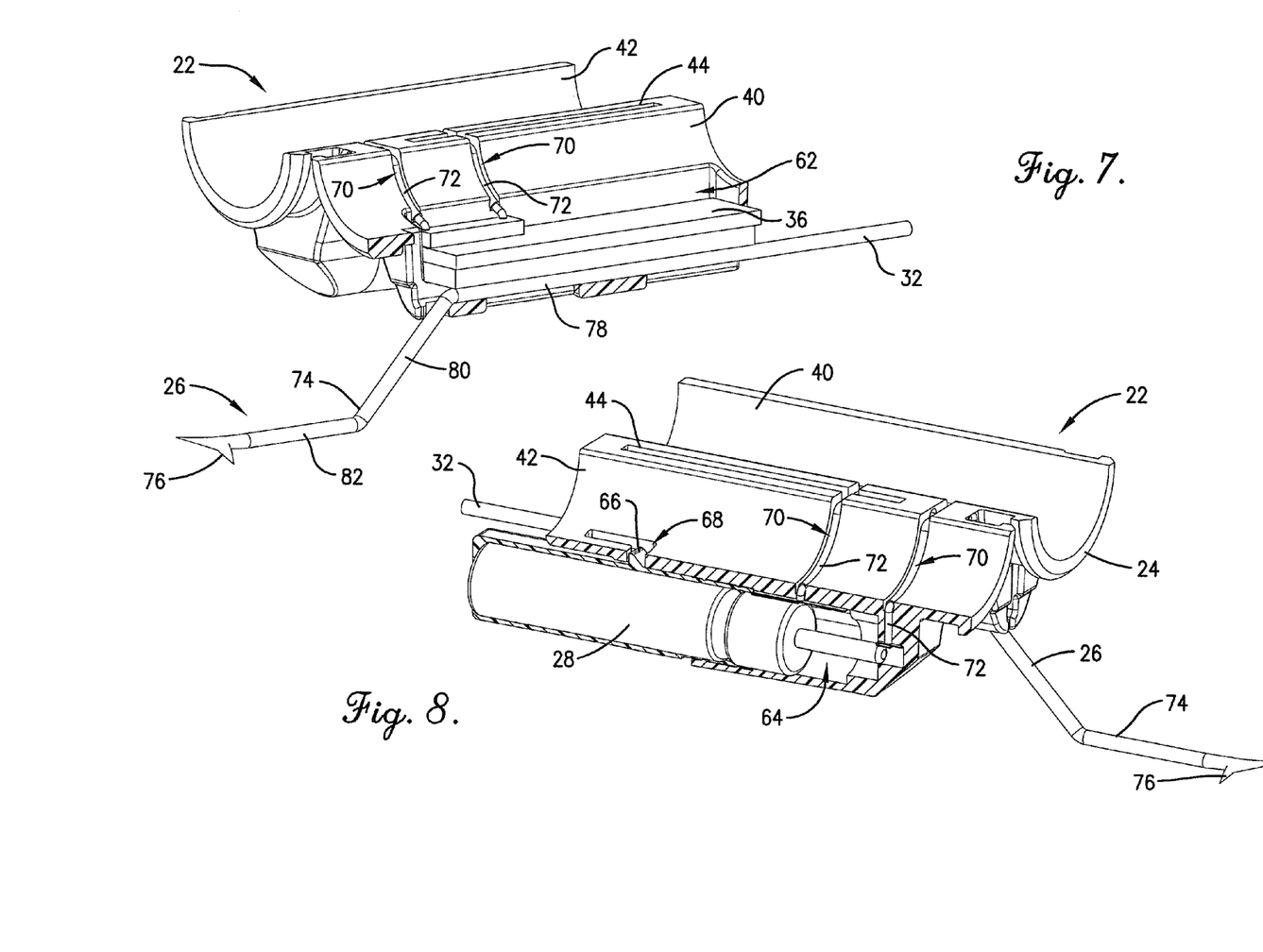
FIG. 7 is a perspective view of the arrow tracking device in an open position, further illustrating a cross-sectional view of a first portion of a housing of the arrow tracking device.
FIG. 8 is a perspective view of the arrow tracking device in the open position, further illustrating a cross-sectional view of a second portion of the housing of the arrow tracking device.

The controller 36 may be bonded, glued, mechanically attached, or integrally formed to the housing 24 within the first cavity 62. The second portion 42 of the housing 24 may be configured to retain the battery 28 in the second cavity 64 (e.g., the battery 28 may be configured to snap into the second cavity 64) until the battery 28 is manually pulled outward therefrom with a threshold amount of force. As illustrated in FIG. 8, the battery 28 may be retained within the second cavity 64 by interconnecting features, such as a locking tab 66 extending from the battery 28 or a housing of the battery 28 configured to engage with a locking hole 68 or cavity formed into a wall of the second portion 42 of the housing 24. However, any means for retaining the battery 28 within the second cavity 64 may be used without departing from the scope of the invention. The housing 24 may further have one or more wire channels 70 formed therein extending across both of the two portions 40,42 of the housing 24, linking the first cavity 62 with the second cavity 64 so that wires 72 may extend from the battery 28 to the controller 36 within the wire channels 70, extending over the first joint 44 of the housing 24.

The animal attachment component 26 may be a sharpened wire 74 with a barb 76 extending therefrom. For example, the wire 74 may be attached to and jut outward from the housing 24 and may be sufficient to puncture an animal's skin. For example, a first portion 78 of the wire 74 may be attached to the housing 24, a second portion 80 of the wire 74 may be angled outward in a direction away from the shaft 14, and a third portion 82 of the wire 74 may be substantially parallel to the shaft 14 of the arrow 12 and extending forward of the second portion 80 of the wire 74, as illustrated in FIG. 7. A point of the sharpened wire 74 may be located at a forward end of the third portion 82 of the wire 74. The point of the wire 74 may face a same direction as a forward-most point of the arrowhead 16 when the transmitter 22 is attached to the shaft 14 of the arrow 12. The barb 76 extending from the wire 74 may also be sharpened or pointed and may angle outward from the wire 74 in an aftward direction, away from the point of the wire 74. Specifically, the barb 76 may be configured to help further secure the animal attachment component 26 to an animal's skin. However, the animal attachment component 26 may have any configuration suitable for attaching the housing 24 to an animal shot by the arrow 12 without departing from the scope of the invention.

Figures 9, 10:
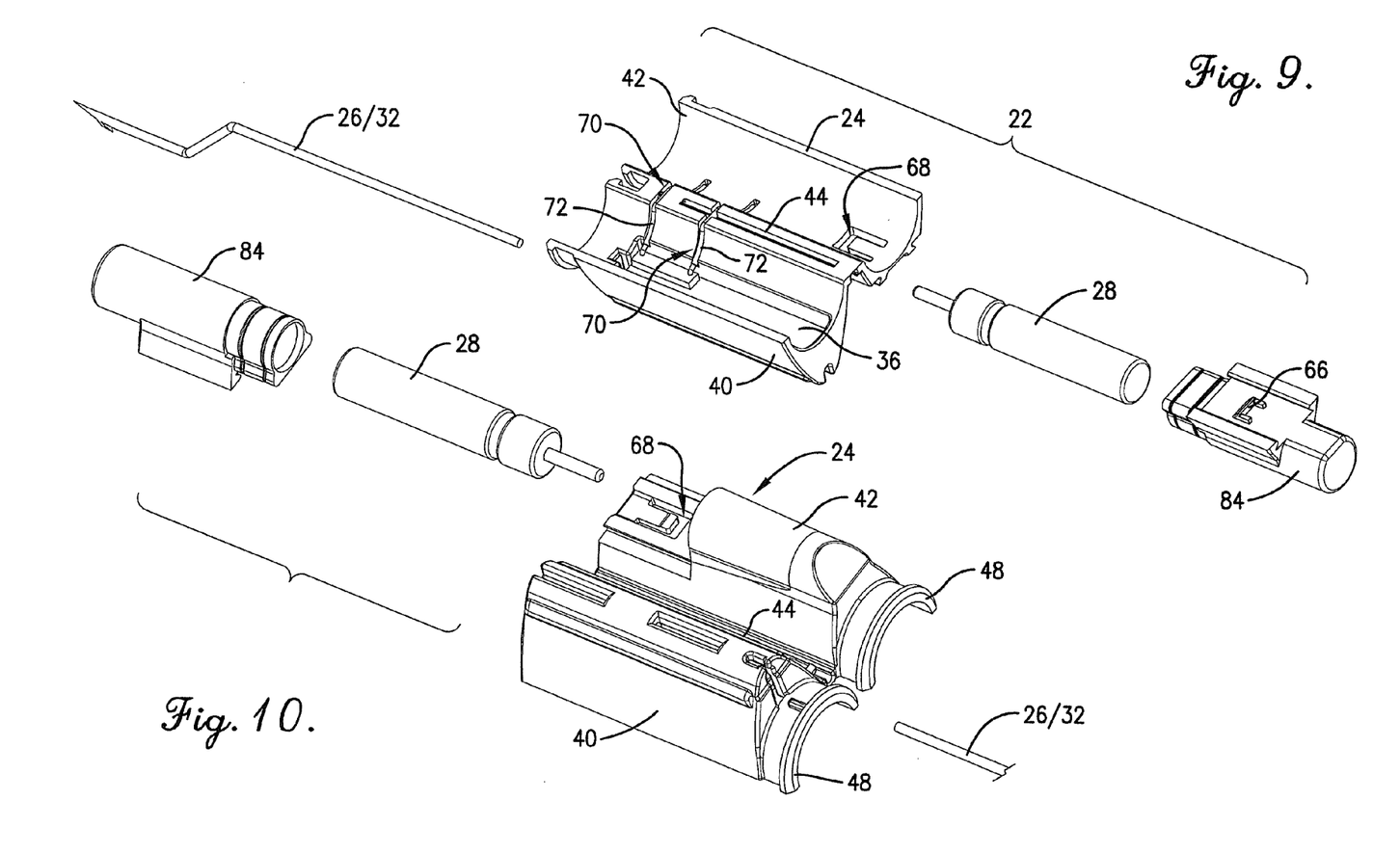
FIG. 9 is an exploded perspective view of the arrow tracking device in the open position, illustrating an inner surface of the housing.
FIG. 10 is an exploded perspective view of the arrow tracking device in the open position illustrating an outer surface of the housing.
Figure 11:
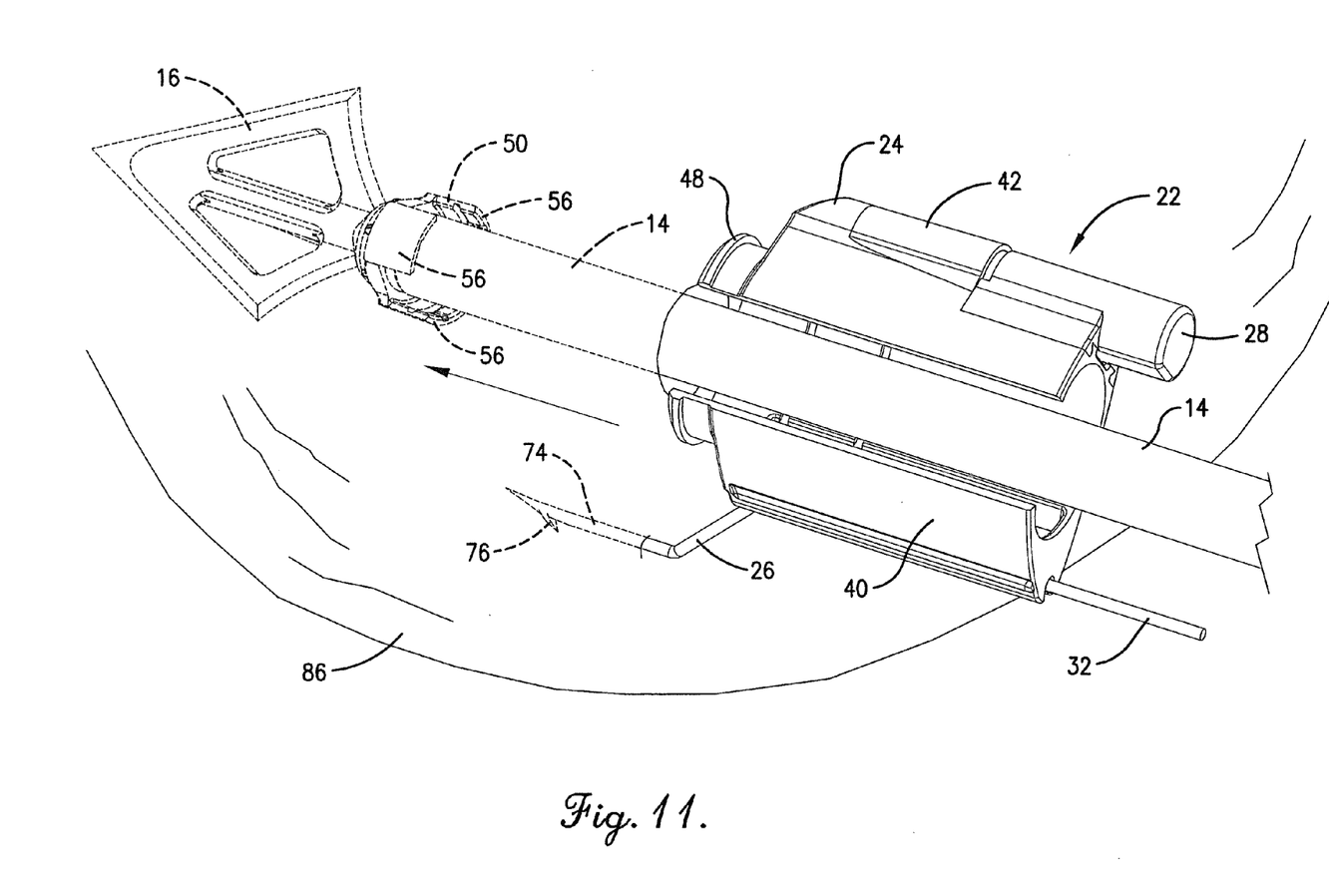
FIG. 11 is a fragmentary perspective view of the arrow striking the deer of FIG. 1 and the arrow tracking device thereby attaching to the deer.
Figure 12:
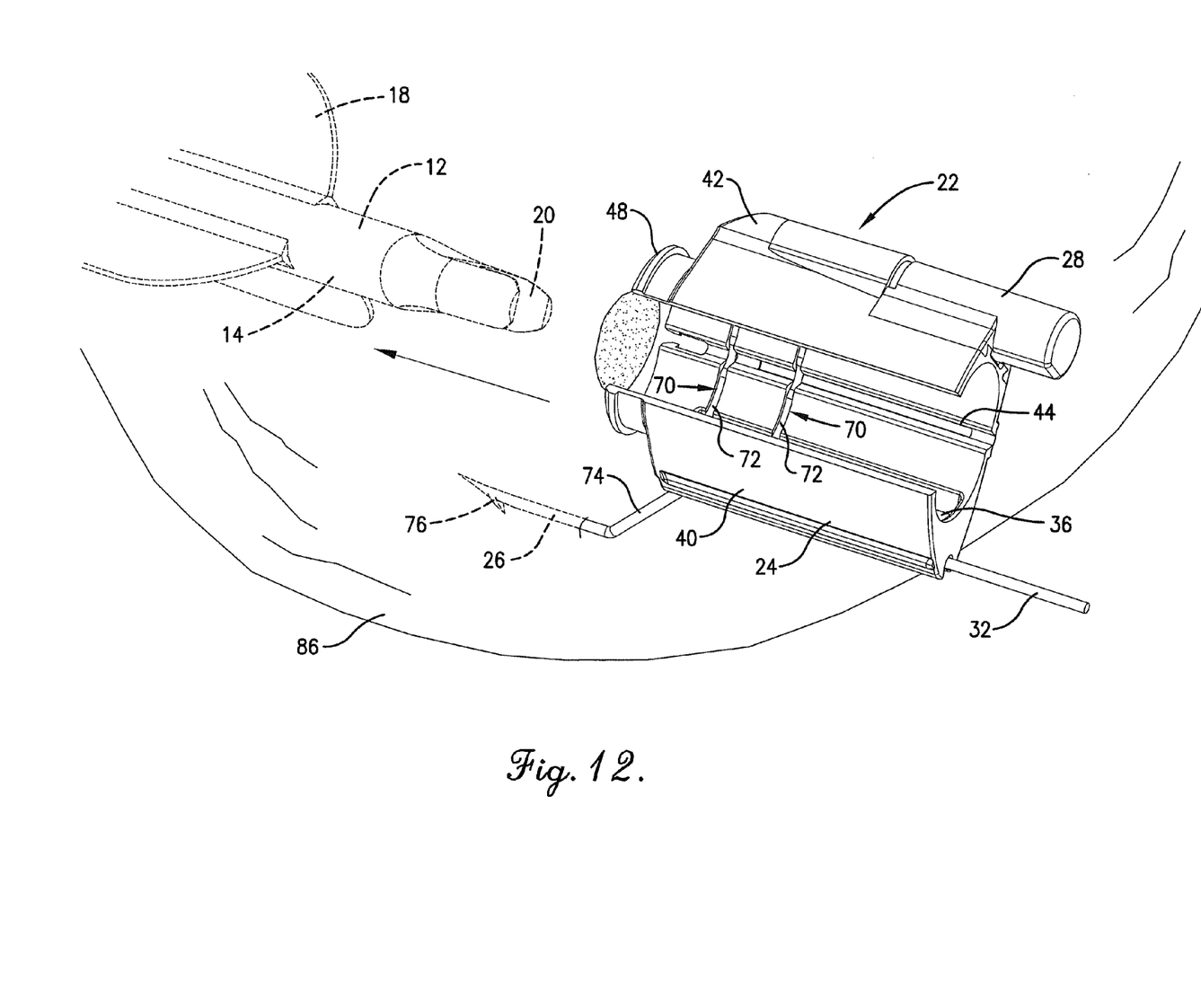
FIG. 12 is a fragmentary perspective view of the arrow continuing to move through the deer of FIG. 1 and the arrow tracking device remaining attached to the deer and completely separated from the arrow.

The battery 28 may be any device sufficient to power the controller 36 and status LED 34, but small enough to fit within the second cavity 64. The battery 28 may preferably be light enough that it does not significantly affect the flight path of the arrow 12. The battery 28 may be joined with the controller 36 via the wires 72 noted above. For example, a positive wire and a negative wire may join the battery 28 and the controller 36 at a battery contact fixed within the second cavity 64. The battery contact may be any jack, port, or electrical connection points electrically coupled with the controller 36. Specifically, when the battery 28 is inserted into the second cavity 64, positive and negative contact points of the battery 28 may be consequently joined with the battery contact fixed within the second cavity 64, thereby electrically coupling the battery with the controller 36, the accelerometer switch 30, and/or the status LED 34. In some embodiments of the invention, the battery 28 may be configured to fit within and be fixed within an attachment housing 84, as illustrated in FIGS. 8-10. The attachment housing 84 may comprise a tab or some other locking feature, such as the locking tab 66 noted above, such that the attachment housing 84 detachably secures the battery 28 within the second cavity 64 of the housing 24.

The accelerometer switch 30, as illustrated in FIG. 2, may comprise an accelerometer, such as a micro electro-mechanical systems (MEMS) switch, configured to measure an amount of acceleration and/or G-force applied to the accelerometer switch 30. The accelerometer switch 30 may be communicably and/or integrally coupled with the controller 36. Specifically, the accelerometer switch 30 may be configured to activate when the arrow 12 is released from a bow, thereby providing an interrupt signal to the controller 36. The interrupt signal may command the controller 36 to begin transmitting radio signals or other wireless signals to the receiver 38 via the antenna 32. Additionally or alternatively, the interrupt signal may be configured to turn on a lighted nock or a lighted end of an arrow, turn on or command flashing of the status LED 34, and/or trigger any electrical action of the animal tracking device 10 and/or electrical elements incorporated into the arrow.

In some embodiments of the invention, the accelerometer switch 30 may oscillate between an awake mode and a sleep mode to save on current being drawn thereby from the battery 28. For example, the accelerometer switch 30 may go to sleep for 1 ms, then wake up and poll itself internally at a rate of 1,000 Hz to determine if a given G force at or above a threshold G force has occurred (e.g. 15.6 G) for a given threshold amount of time (e.g., 6 ms). If the threshold G force is measured by the accelerometer and the threshold amount of time has passed, the interrupt signal may be sent by the accelerometer switch 30 to the controller 36.

The antenna 32 may be a wire communicably and physically coupled with the controller 36 and may be attached to and secured by the housing 24. For example, the antenna 32 may be a thin wire extending aftward from the housing 24 in a direction opposite of the direction in which the animal attachment component 26 extends. In some embodiments of the invention the antenna 32 may be integral with the animal attachment component 26, as illustrated in FIGS. 7-9, such that part or all of the animal attachment component 26 also operates as the antenna 32.

In some embodiments of the invention, the antenna 32 may be a monopole antenna, integral with the animal attachment component 26 and extending a distance forward and aftward of the housing 24. In other embodiments of the invention, the antenna 32 may be a dipole antenna having two pieces. A first piece of the dipole antenna may be the animal attachment component 26 (e.g., a pointed wire with a barb) extending in a forward direction from the housing 24 and a second pieces of the dipole antenna may be a separate wire extending aftward from the housing 24. This dipole antenna may create a ground plane for better transmission. For example, when the pointed wire and barb sticks into an animal, this may increase the ground plane and make the antenna more efficient.

The status LED 34 may be physically and communicably coupled with the controller 36 and may be configured to be turned on an off by the controller 36. The status LED 34 may be of any size and configuration and may output any color, frequency, or brightness of light desired for a given application. The status LED 34 may be configured to be turned on and off at any desired time interval depending on signals received by the controller 36. For example, rapid blinking of the status LED 34 or no blinking of the status LED 34 may indicate a low battery voltage. Slower on/off intervals of the status LED 34 may indicate that the transmitter 22 is transmitting signals to the receiver 38. In other embodiments of the invention, the status LED 34 may include a plurality of LEDs which may indicate various statuses of the transmitter 22 using any combination of different LED colors, different brightnesses, and turning on and off at differing intervals.

The controller 36, illustrated in FIG. 7, may comprise a microcontroller, a microprocessor, or any number and combination of controllers, circuits, integrated circuits, programmable logic devices such as programmable logic controllers (PLC) or motion programmable logic controllers (MPLC), computers, processors, other electrical and computing devices, and/or other data and signal processing devices for automating or otherwise carrying out the functions described herein, and may additionally comprise one or more memory storage devices, transmitters, receivers, and/or communication busses and ports. Ideally, the controller 36 may be of a size and weight small enough to have little effect on a trajectory of the arrow 12. The controller 36 may be configured to receive power from the battery 28, receive "arrow released" signals from the accelerometer switch 20, turn the status LED 34 on and off, and/or output signals, such as radio waves via the antenna 32 to the receiver 38.

In some embodiments of the invention, the controller 36 may be configured to implement any combination of the algorithms, subroutines, or code corresponding to method steps and functions described herein. The controller 36 and/or computer programs described herein are merely examples of computer equipment and programs that may be used to implement the present invention and may be replaced with or supplemented with other controllers and computer programs without departing from the scope of the present invention. In some embodiments of the invention, the controller 36 may implement a computer program and/or code segments to perform some of the functions described herein. The computer program may comprise an ordered listing of executable instructions for implementing logical functions in the control system. The computer program can be embodied in any computer-readable medium for use by or in connection with an instruction execution system, apparatus, or device, and execute the instructions. In the context of this application, a "computer-readable medium" can be any physical means that can contain, store, communicate, propagate, or transport the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), a portable compact disk read-only memory (CDROM), an optical fiber, multi-media card (MMC), reduced-size multi-media card (RS MMC), secure digital (SD) cards such as microSD or miniSD, and a subscriber identity module (SIM) card.

As noted above, the controller 36 may comprise memory storage devices or other various memory elements. The memory may include one or more memory storage devices which may be integral with the controller, stand alone memory, or a combination of both. The memory may include, for example, removable and non removable memory elements such as RAM, ROM, flash, magnetic, optical, USB memory devices, MMC cards, RS MMC cards, SD cards such as microSD or miniSD, SIM cards, and/or other memory elements. For example, the memory may store at least a portion of the computer program or code segments described above, threshold trigger values (e.g., a minimum G-force) to be detected by the accelerometer switch, and threshold amounts of time that must pass at or above the given accelerometer switch trigger value for the controller to begin transmitting signals via the antenna to the receiver.

In some embodiments of the invention, the transmitter 22 or controller 36 may be configured to modulate the signal output via the antenna 34 to avoid interference with other ambient signals. Furthermore, the transmitter 22 or controller 36 may be configured to pulse in a predetermined pattern and the receiver 38 may be configured to only search for or detect signals having this predetermined pattern.

In one exemplary embodiment of the invention, the controller 36 may comprise a SAW resonator used in a Colpitts type oscillator configuration. The SAW resonator may have a center frequency of any value (e.g., 902-928 MHz). In this exemplary embodiment, the controller 36 may also comprise an oscillator amplifier configured to implement the Colpitts type oscillator with the SAW resonator and an output amplifier used to provide load isolation and gain to amplify the oscillator to a required output power (e.g. +13 dBm). Note that any center frequency and required output power values may be used without departing from the scope of the invention. The controller 36 may also comprise various conventional filters and circuitry not described in detail herein without departing from the scope of the invention.

The receiver 38 may be any receiver known in the art and may be configured for receiving radio signals or any wireless signals transmitted by the transmitter 22. In some embodiments of the invention, the receiver 38 may be configured to provide visual and/or audio indications of a proximity of the transmitter 22 to a user. For example, the receiver 38 may comprise a user interface having LEDs, display screens, speakers, headphone jack. or other devices suitable for providing feedback to the user. In some embodiments of the invention, a color of a visual indicator may change or an audible tone may increase in pitch, frequency, and/or volume as the receiver and transmitter are brought closer together. Furthermore, the visual and/or audio indications may also be used to indicate receipt of transmitted signals and/or low battery voltage of the receiver 38. In some exemplary embodiments of the invention, the receiver 38 may be configured to read a received signal strength indication (RSSI) at multiple frequencies using a small predetermined bandwidth allowing the receiver to compensate for transmitter frequency drift.

In use, the controller 36 may be configured to monitor the battery's voltage and to command the status LED 34 to provide a warning signal if the battery voltage is low (e.g., rapidly turning the status LED 34 on and off if the battery 28 has low voltage). The controller 36 may also be configured to receive signals or other indications from the accelerometer switch 30 indicating that the arrow 12 was released or shot from a bow. For example, if the controller 36 receives an indication that the arrow 12 was released, the controller 36 may turn the status LED 34 on for a predetermined amount of time (e.g., one to two minutes) and then pulse the controller's oscillator and the status LED 34 at a predetermined rate and duty cycle thereafter. The controller 36 may therefore monitor the accelerometer switch 30 and begin transmitting radio signals or some other wireless signal to be received by the receiver 38 when the accelerometer switch 30 indicates that the arrow 12 was released.

The controller 36 may also be configured to turn on the transmitter 22 or otherwise transmit wireless signals to the receiver 38 for a short duration of time upon initial insertion of the battery 28 to determine if the battery's voltage is low or not. For example, the transmitter 22 may operate (e.g., transmit radio signals) for approximately two minutes immediately following insertion of the battery 28 into the second cavity 64 so that a user can verify operation with the receiver 38. In some embodiments of the invention, the controller 36 may further be configured to receive a wireless acknowledgement signal from the receiver 38, via the antenna 32, indicating that the receiver 38 received the signal from the transmitter 22. If this acknowledgement signal is not received by the controller 36 in a predetermined amount of time, the controller 36 may simply command the status LED 34 to blink in such a manner as to indicate a problem or malfunction. If the acknowledgement signal is successfully received by the controller 36 and the battery 28 is not low (e.g., below a threshold voltage), the controller 36 may automatically be placed in or place itself in a stand-by mode until it receives an interrupt signal from the accelerometer switch 30 indicating that the arrow 12 was released or shot from a bow. In some embodiments of the invention, once the interrupt signal is received by the controller 36, the controller 36 may automatically disable the accelerometer switch 30 so that it does not draw current from the battery 28. The interrupt signal may activate the controller 36 or place the controller 36 in a transmitting mode in which the controller 36 transmits radio signals via the antenna 32 to the receiver 38.

A method of the present invention may generally include the steps of inserting the battery 28 into the housing 24, checking the battery voltage with the controller 36, and placing the controller 36 in a stand-by mode until an interrupt signal is received from the accelerometer switch 30. The method may also include the steps of closing the first and second portions 40,42 of the housing 24 around the shaft 14 of the arrow 12 and sliding the lip 48 or ledge of the housing 24 into the sleeve 50 fixed to the arrow 12. The method may further comprise shooting the arrow 12 at a target. When the arrow 12 hits the target, such as a deer 86 illustrated in FIGS. 1, 11, and 12, the animal attachment component 26 may subsequently attach the transmitter 22 to some part of the target, such as a skin of the deer 86, and the housing 24 may be forced out of the sleeve 50, thereby disconnecting the transmitter 22 from the arrow 12. Next, the method may comprise sensing with the accelerometer switch 30 that the arrow 12 was shot from the bow and sending the interrupt signal to the controller 36. When the controller 36 receives the interrupt signal, the method may then include a step of the controller 36 sending a wireless signal via the antenna 32 to the receiver 38. Then, the method may include the step of tracking the transmitter 22 with the receiver 38 based on strength of signal received by the receiver 38 from the transmitter 22.

Figure 13:
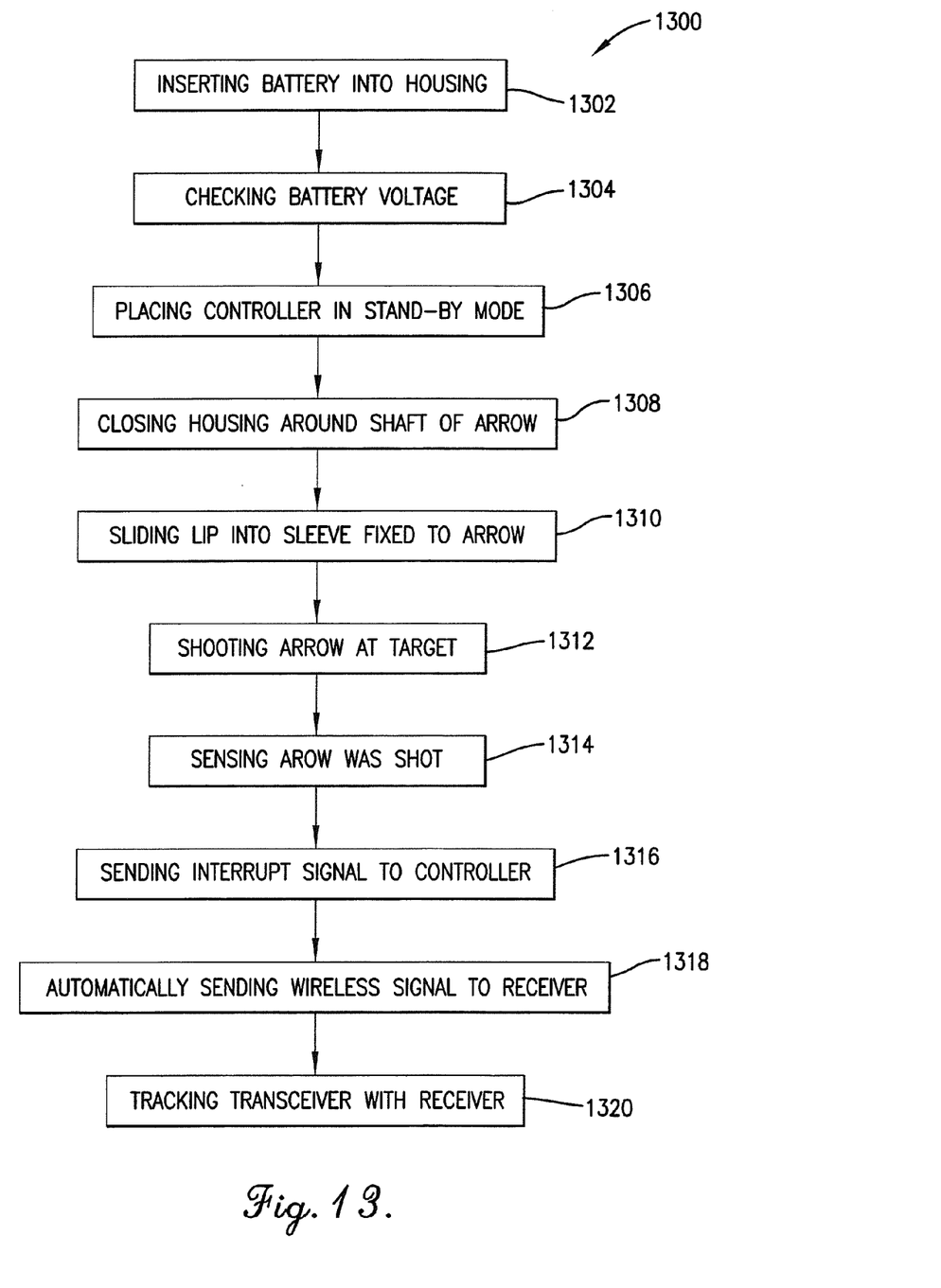
FIG. 13 is a flow chart of a method of tracking an animal shot with a bow in accordance with an embodiment of the present invention.

The flow chart of FIG. 13 depicts the steps of an exemplary method 1300 for hunting and tracking game. In some alternative implementations, the functions noted in the various blocks may occur out of the order depicted in FIG. 13. For example, two blocks shown in succession in FIG. 13 may in fact be executed substantially concurrently, or the blocks may sometimes be executed in the reverse order depending upon the functionality involved.

As illustrated in FIG. 13, the method 1300 may include a step of inserting the battery 28 into the housing 24, as depicted in block 1302. The battery may snap into the second cavity 64 of the housing 28 and remain retained therein until manually pulled out with sufficient force. Once the battery 28 is retained in the second cavity 64, it may contact ports or wires 72 connected to the controller 36. Next, the method 1300 may include the steps of checking the battery voltage via the controller 36, as depicted in block 1304, and placing the controller 36 in a stand-by mode, as depicted in block 1306, until an interrupt signal is received from the accelerometer switch 30. As noted above, the controller 36 may be configured to automatically determine a voltage of the battery 28 upon initial insertion of the battery 28 into the second cavity 64. If the voltage is low, the controller 36 may be configured to indicate low voltage via the status LED 34 and/or by sending a wireless signal to the receiver 38 indicating the transmitter's battery voltage is low. Otherwise, the controller 36 may be automatically placed into a stand-by mode or sleep mode in which it draws little or now power from the battery 28, other than to provide continual or period power to the accelerometer switch 30. For example, the accelerometer switch 30 may oscillate on and off ever millisecond to take a G force measurement or may substantially continuously measure G force.

The method 1300 may also include the steps of closing the first and second portions 40,42 of the housing 24 around the shaft 14 of the arrow 12, as depicted in blocks 1308, and sliding the lip 48 or ledge of the housing 24 into the sleeve 50 fixed to the arrow 12, as depicted in block 1310. The sleeve 50 may hold the housing 24 in the closed position therein. The clocking features 60 of the sleeve 50 and/or the housing 24 may also engage such that the housing 24 is properly rotationally aligned relative to each other. The method may further comprise shooting the arrow 12 at a target (e.g., the deer 86), as depicted in block 1312. When the arrow 12 hits the target, the animal attachment component 26 may subsequently attach the transmitter 22 to some part of the target, such as the animal's skin, and the housing 24 may be forced out of the sleeve 50, thereby disconnecting the transmitter 22 from the arrow 12. For example, the wire 74 and barb 76 may be lodged into the animal's skin. As the arrow 12 continues through the dear 86, the sharpened wire of the animal attachment component 26 sticks therein, with the momentum of the arrow 12 pulling the sleeve 50 away from the housing 24. Once the housing 24 is released from within the sleeve 50 and therefore disconnected from the arrow 12, the housing 24 returns to its naturally-biased open position.

Next, the method 1300 may comprise sensing with the accelerometer switch 30 that the arrow 12 was shot from the bow, as depicted in block 1314, and sending the interrupt signal to the controller 36, as depicted in block 1316. If the G force measurement obtained by the accelerometer switch 30 is greater than the trigger threshold amount for a threshold amount of time, the accelerometer switch 30 may send the interrupt signal to the controller 36, switching the controller 36 from the stand-by mode to an awake mode. Note that the threshold amount of time is generally set such that simply dropping the arrow or transmitter will not trigger the interrupt signal. The amount of G force required may be a minimum amount generally experienced by an arrow being shot by a bow, or any suitable value determined for a particular hunting application.

In the awake mode, the controller 36 begins transmitting wireless signals via the antenna 32 to be tracked by the receiver 22. Thus, when the controller 36 receives the interrupt signal, the method 1300 may then include a step of the controller 36 automatically sending or transmitting a wireless signal via the antenna to the receiver, as depicted in block 1318. Next, the method 1300 may include the step of tracking the transmitter 22 with the receiver 38 based on strength of signal received by the receiver 38 from the transmitter 22, as depicted in block 1320. The receiver 38 may visually and/or audibly indicate both a strength and a direction of the transmitter 22 so that the user of the receiver may track the transmitter 22 and thereby track the animal shot by the arrow 12, even if the arrow 12 has flown through or fallen out of the animal or the deer 86.

Although the invention has been described with reference to the preferred embodiment illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An animal tracking device configured to removably attach to an arrow shaft, the animal tracking device comprising:

an antenna;
a controller communicably coupled with the antenna and configured for sending wireless signals to a receiver via the antenna;
a battery contact electrically coupled with the controller and configured to receive a battery;
a hollow housing configured for supporting the antenna, the controller, and the battery contact, the housing shiftable between a closed position and an open position and configured to be detachably attached in the closed position to the arrow shaft, wherein the housing comprises a first portion and a second portion pivotally attached with each other at a first joint, configured to meet but not attach with each other at a second joint in the closed position, and configured to pivot between the closed position and the open position about the first joint, wherein the first joint is a line of weakness or hinge configured to allow pivoting of the first portion relative to the second portion; and
an animal attachment component fixed to the housing, configured to pierce a target or animal shot by the arrow, slowing or stopping forward momentum of the housing and thereby forcing the housing away from the arrow, wherein the housing is naturally biased in the open position when not attached to the arrow shaft.

2. The animal tracking device of claim 1, wherein the animal attachment component is a sharpened wire having a barb extending therefrom, wherein the barb is angled to prevent reward withdrawal of the animal attachment component from the target or animal.

3. The animal tracking device of claim 1, further comprising a sleeve attachable to the arrow and configured to detachably attach the housing to the arrow and retain the housing in the close configuration, such that at least a portion of the housing rests between the sleeve and the arrow shaft when the housing is in the closed position around the arrow shaft.

4. The animal tracking device of claim 1, wherein the controller is attached to the first portion of the housing and the battery contact is attached to the second portion of the housing.

5. The animal tracking device of claim 1, further comprising an accelerometer switch configured to measure an amount of G force experienced by the accelerometer switch, wherein the accelerometer switch is communicably coupled with the controller and configured to send an interrupt signal to the controller when the amount of G force measured by the accelerometer switch is at or greater than a threshold amount for a threshold amount of time.

6. The animal tracking device of claim 5, wherein the controller is configured to send wireless signals to the receiver in response to receiving the interrupt signal.

7. The animal tracking device of claim 3, wherein the housing further comprises a ledge or lip extending radially outward therefrom and the sleeve comprises an outer surface and an inner surface, the inner surface having a retaining feature configured to mate with the ledge or lip of the housing.

8. An animal tracking device configured to removably attach to an arrow shaft, the animal tracking device comprising:
an antenna;
a controller communicably coupled with the antenna and configured for sending wireless signals to a receiver via the antenna;
a battery configured to be electrically coupled with the controller;
a hollow housing having a first portion and a second portion pivotally attached with each other at a first joint, configured to meet but not attach with each other at a second joint in a closed position, and configured to pivot between the closed position and an open position about the first joint, wherein the housing is configured to be detachably attached in the closed position to the arrow shaft, wherein the antenna, controller, and battery are attachable to the housing, wherein the first joint is a line of weakness or hinge configured to allow pivoting of the first portion relative to the second portion; and
an animal attachment component comprising a sharpened wire extending forward from the housing, the animal attachment component configured to pierce a target or animal shot by the arrow, slowing or stopping forward momentum of the housing and thereby forcing the housing away from the arrow, wherein the housing is naturally biased in the open position when not attached to the arrow shaft.

9. The animal tracking device of claim 8, wherein the animal attachment component further comprises a barb extending therefrom, wherein the barb is angled slightly aftward to prevent reward withdrawal of the animal attachment component from the target or animal.

10. The animal tracking device of claim 8, further comprising a sleeve attachable to the arrow and configured to detachably attach the housing to the arrow shaft such that at least a portion of the housing rests between the sleeve and the arrow shaft, which retains the housing in the closed configuration until the housing is pushed away from and out of the sleeve by impact force, which returns the housing to the naturally-biased open position, releasing the arrow shaft.

11. The animal tracking device of claim 8, wherein the housing further comprises at least one cavity configured for at least one of housing and retaining the controller or the battery therein.

12. The animal tracking device of claim 8, wherein the controller is attached to the first portion of the housing and the battery is attached to the second portion of the housing.

13. The animal tracking device of claim 8, further comprising an accelerometer switch configured to measure an amount of G force experienced by the accelerometer switch, wherein the accelerometer switch is communicably coupled with the controller and configured to send an interrupt signal to the controller when the amount of G force measured by the accelerometer switch is at or greater than a threshold amount for a threshold amount of time, wherein the controller is configured to send wireless signals to the receiver in response to receiving the interrupt signal.

14. The animal tracking device of claim 10, wherein the housing further comprises a ledge or lip extending radially outward therefrom and the sleeve comprises an outer surface and an inner surface, the inner surface having a retaining feature configured to mate with the ledge or lip of the housing.

15. A method of tracking an animal, the method comprising:
closing a housing of a transmitter in a closed position around a shaft of an arrow, wherein the housing comprises a first portion and a second portion pivotally attached with each other at a first joint, configured to meet but not attach with each other at a second joint in the closed position, and configured to pivot between the closed position and a naturally-biased open position about the first joint, wherein an animal attachment component extends from the housing and is configured to pierce a target or animal;
inserting at least a portion of the housing into a sleeve attached to the shaft of the arrow, such that the sleeve retains the housing in the closed position, thereby detachably attaching the housing to the sleeve;

shooting the arrow into the target or animal such that the animal attachment component pierces the target or animal, thereby pulling the housing away from the sleeve upon impacting the target or animal, such that the housing returns to its naturally-biased open position; and tracking wireless signals emitted from the transmitter with a receiver configured to receive wireless signals from the transmitter.

16. The method of claim 15, further comprising a step of inserting a battery into a cavity in the housing such that the battery electrically powers a controller of the transmitter fixed to the housing, wherein the controller is configured to indicate if the battery has a voltage at or above a given threshold.

17. The method of claim 16, wherein the transmitter further comprises an antenna communicably coupled with the controller and the controller is configured to begin transmitting the wireless signals to the receiver in response to the shooting of the arrow.

18. The method of claim 17, wherein the signals transmitted by the transmitter are radio signals.

19. The method of claim 17, wherein tracking the signal further comprises detecting the direction and strength of the wireless signals from the transmitter with the receiver.

* * * * *